United States Patent
Jacobs

(10) Patent No.: US 8,875,209 B2
(45) Date of Patent: Oct. 28, 2014

(54) METHOD AND SYSTEM FOR RECEIVING CONTENT IN A CONTENT PROCESSING SYSTEM USING A WORKFLOW SYSTEM

(75) Inventor: Mitch C. Jacobs, Rancho Palos Verdes, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2114 days.

(21) Appl. No.: 11/828,625

(22) Filed: Jul. 26, 2007

(65) Prior Publication Data
US 2009/0031377 A1    Jan. 29, 2009

(51) Int. Cl.
H04N 7/173     (2011.01)
H04N 21/8352   (2011.01)
H04N 21/433    (2011.01)
H04H 60/02     (2008.01)

(52) U.S. Cl.
CPC ....... H04N 7/17336 (2013.01); H04N 21/8352 (2013.01); H04N 21/4331 (2013.01); H04H 60/02 (2013.01)
USPC .......................................................... 725/116

(58) Field of Classification Search
None
See application file for complete search history.

(56) References Cited

U.S. PATENT DOCUMENTS

| | | | |
|---|---|---|---|
| 5,579,055 A | 11/1996 | Hamilton et al. | |
| 5,594,490 A | 1/1997 | Dawson et al. | |
| 6,028,639 A | 2/2000 | Bhatt et al. | |
| 6,401,243 B1 | 6/2002 | Suzuki | |
| 6,700,932 B2 | 3/2004 | Shen et al. | |
| 6,963,590 B1 | 11/2005 | Mann et al. | |
| 7,103,906 B1 | 9/2006 | Katz et al. | |
| 7,181,010 B2 | 2/2007 | Russ et al. | |
| 7,254,622 B2 | 8/2007 | Nomura et al. | |
| 7,277,870 B2 | 10/2007 | Mourad et al. | |
| 7,301,944 B1 | 11/2007 | Redmond | |
| 7,778,875 B2 | 8/2010 | Schauser et al. | |
| 2002/0009283 A1 | 1/2002 | Ichioka et al. | |
| 2002/0023268 A1 | 2/2002 | LaRocca et al. | |
| 2002/0103920 A1 | 8/2002 | Berkun et al. | |
| 2003/0028889 A1 | 2/2003 | McCoskey et al. | |
| 2003/0066085 A1 | 4/2003 | Boyer et al. | |
| 2004/0019900 A1 | 1/2004 | Knightbridge et al. | |
| 2004/0103120 A1 | 5/2004 | Fickle et al. | |
| 2004/0236620 A1 | 11/2004 | Chauhan et al. | |
| 2005/0203927 A1 | 9/2005 | Sull et al. | |
| 2006/0053347 A1 | 3/2006 | van Ingen et al. | |
| 2006/0171390 A1* | 8/2006 | La Joie | 370/390 |
| 2006/0206912 A1 | 9/2006 | Klarfeld et al. | |
| 2006/0212900 A1 | 9/2006 | Ismail et al. | |

(Continued)

OTHER PUBLICATIONS

Non-final Office action dated Oct. 28, 2010 in U.S. Appl. No. 12/150,153 filed Apr. 25, 2008 by U.S. Appl. No. 12/150,153.

*Primary Examiner* — Brian T Pendleton
*Assistant Examiner* — Ryan Stronczer

(57) ABSTRACT

A system and method for receiving data in a content processing system includes a receiving system receiving content and metadata, an incoming folder storing the content and a content management system receiving a notice signal corresponding to receiving of content and metadata. The content management system generates a material identification for the content, creating an inventory list at the content management system and communicating the matter identification to the workflow system. The workflow system processes the content into formatted files and storing the formatted files in a broadcast folder. The content management system communicates conditional access data to video transport processing system. The workflow system communicates a status message to the content management system when the formatted files are stored in the broadcast folder.

22 Claims, 9 Drawing Sheets

(56) References Cited

U.S. PATENT DOCUMENTS

| | | |
|---|---|---|
| 2006/0212904 A1 | 9/2006 | Klarfeld et al. |
| 2007/0022214 A1 | 1/2007 | Harcourt |
| 2007/0033531 A1 | 2/2007 | Marsh |
| 2007/0079168 A1 | 4/2007 | Sivakumar et al. |
| 2007/0089151 A1* | 4/2007 | Moore et al. .................. 725/132 |
| 2007/0107012 A1* | 5/2007 | Rachamadugu ................ 725/34 |
| 2007/0107032 A1* | 5/2007 | Rachamadugu .............. 725/114 |
| 2007/0130235 A1 | 6/2007 | Rakoff et al. |
| 2007/0199022 A1 | 8/2007 | Moshiri et al. |
| 2007/0199037 A1 | 8/2007 | Matsuzaki et al. |
| 2007/0250487 A1 | 10/2007 | Reuther |
| 2008/0216111 A1 | 9/2008 | Alten et al. |
| 2008/0222678 A1 | 9/2008 | Burke et al. |
| 2008/0282190 A1 | 11/2008 | Kagaya |
| 2008/0309647 A1 | 12/2008 | Blose et al. |
| 2009/0029644 A1 | 1/2009 | Sue et al. |
| 2009/0240735 A1 | 9/2009 | Grandhi et al. |
| 2010/0088497 A1 | 4/2010 | Bunin |
| 2010/0241476 A1 | 9/2010 | Fitzpatrick et al. |

* cited by examiner

METHOD AND SYSTEM FOR RECEIVING CONTENT IN A CONTENT PROCESSING SYSTEM USING A WORKFLOW SYSTEM

TECHNICAL FIELD

The present disclosure relates to a content processing and delivery system and, more specifically, to a system and method for receiving and processing content within the content processing system.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers may receive content from various sources. Processing the content to be available for broadcast is important.

SUMMARY

The present disclosure allows the processing and coordination of received content within a content processing system.

In one aspect of the disclosure, a method includes receiving content and metadata, storing the content in an incoming folder, notifying a content management system of receiving content and metadata, generating a material identification for the content at the content management system, creating an inventory list at the content management system, communicating the matter identification to the workflow system, processing the content into formatted files, storing the formatted files in a broadcast folder, communicating conditional access data to video transport processing system from the content management system and communicating a status message to the content management system when the formatted files are stored in the broadcast folder.

In another aspect of the invention, a system includes a receiving system receiving content and metadata, an incoming folder storing the content and a content management system receiving a notice signal corresponding to receiving of content and metadata. The content management system generates a material identification for the content, creating an inventory list at the content management system and communicating the matter identification to the workflow system. The workflow system processes the content into formatted files and storing the formatted files in a broadcast folder. The content management system communicates conditional access data to video transport processing system. The workflow system communicates a status message to the content management system when the formatted files are stored in the broadcast folder.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
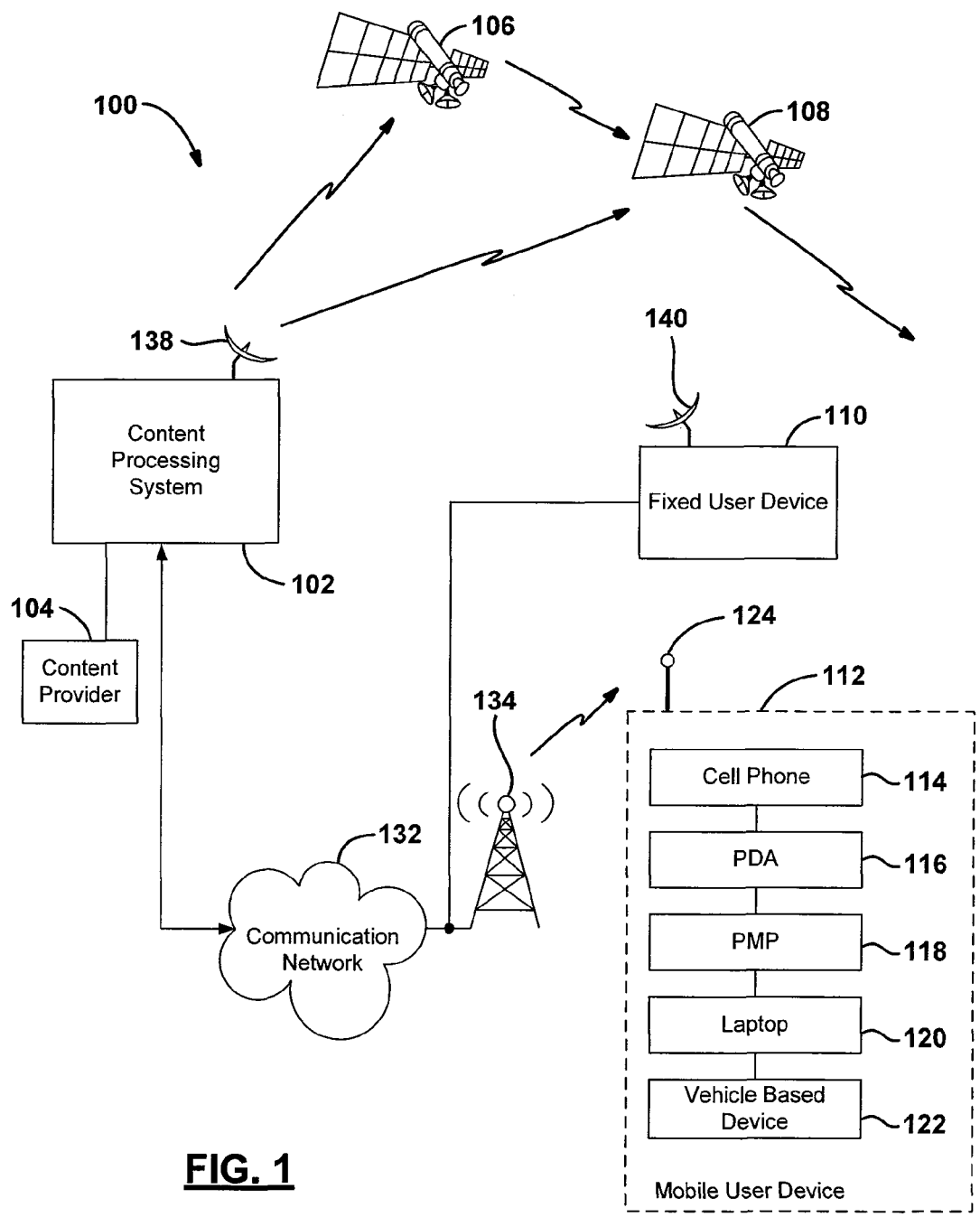
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a terrestrial system such as cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs) or set-top box. Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106,108, one or more of which may be a geosynchronous or geostationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
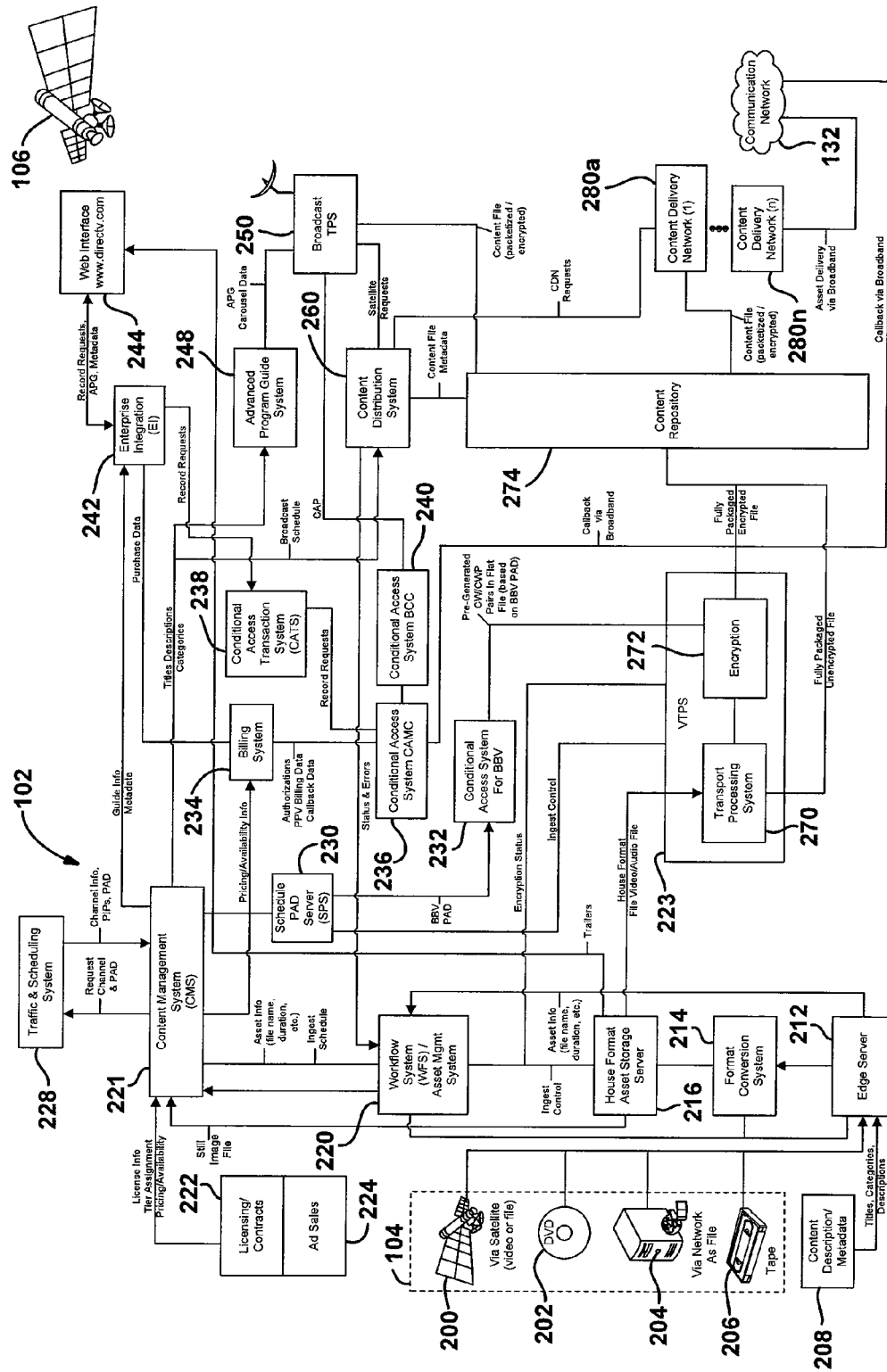
FIG. 2 is a detailed block diagrammatic view of the content processing system of FIG. 2.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide graphics, content description, and other metadata 208 to the system.

The content providers 104 may be various types of content providers and provide various types of content including advertising content such as row advertising (ads) is further described below. The content providers may provide various types of information including advertising information. Advertising providers may provide information on various products or various available or future content. It should be noted that the advertising provider and the content provider may be one and the same.

Information as to row ads may be provided by a content provider or an advertising provider. The row ads are ads that form a row or can take up a row or partial row in the program guide. Information received from the various providers may include various types of metadata, graphics, and the like. The metadata may also include location data as to where the row ad may fit as well as links to posters, asset or material identifications and various other links. Links provide a path to various other information. Links may also cause an action to be performed, such as tuning to a particular channel. The specifics of this will be described below.

The row ad metadata may include provider information that includes an identifier for identifying the content provided from the provider. A product identifier may also be included in the row ad metadata. An asset name stream may also be used to identify the asset. Major version numbers and minor version numbers may also be provided for the row ad content. A short description of the content may also be provided in the metadata. The creation date identifying the creation date of the content or row ad may also be provided in the metadata. A provider ID may also be formed. The provider ID may be various types of identification, including an internet domain name. An asset ID may be provided by the provider to identify the asset. A unique portable or material identification of the asset may be a combination of the provider ID and the asset identification. The material ID will be further described below in reference to the content management system which uses the material identification for various assets, including row ads. An asset class may also be assigned to the system. A verb may also be formed in the metadata. Verbs may include commands such as empty string and delete.

A link type may also be provided in the metadata that is used to identify a title of the asset, a channel or a homepage to which the row ad will link. The link type will also be described further below.

A link asset ID may also be included in the metadata. The link asset ID identifies the link from the row ad to the asset ID of the title asset. If the link is to a channel or homepage, this metadata may not be included.

Rollover text metadata may also be included in the system. The rollover text may appear when the particular row ad is highlighted by the user device. This string may include a phrase or other textual communication.

A text-only ad field may also be included in the metadata. A text-only ad includes merely a string of characters to be displayed. A text-only ad font may be used to change the font of the text-only ad. Various types of fonts, such as those commonly available in word processors, may be used. This may give the row ad a different look than the remaining portions of the program guide.

Content providers may also have a homepage within the present system. Briefly, the homepage is a portion of the program guide for selecting content to be downloaded to the user device. The system operator may also have its own homepage that has various categories of content. The categories and types of homepages will be described below.

The homepage may be formed in various configurations including a menu structure. The content providers may also provide various metadata for the menu structure or program guide.

Each provider may also have a home page within the system from which a user device may be used to select and navigate through the menu. Ultimately, a selection may be made and communicated from the user device back to the content distribution network (CDN), whereby the CDN provides the content to the user device. Content metadata used for identification may also be provided relative to the home page, and link the content to one or more home pages. The provider, product, asset name, version major, version minor, description, creation date, provider ID, asset ID, asset class and verb, as described above with respect to the row ad, may also be provided in the home page metadata. In addition, a home page construction type may be provided in the metadata. For example, the home construction type may use the wording "complete" to refer to images of posters, background and other information. The string "background" may only provide a particular background scene upon which graphics and other data is placed. The background and various aspects of the home page will be described below.

The metadata for the homepage may also include a home construct template that represents a template number that may be filled in by the various content providers. The operator of the content processing system may establish various homepage templates for which various information may be provided by the content providers to fill in the homepage. Various categories and the like may be filled in by the content providers within the various parameters of the various templates. This portion of the metadata may be used to identify the pre-made templates.

A poster art position metadata may also be provided by the content provider. Various poster positions, as will be described below, may be established by the content processing system. As will be described below, the posters may be used in a "complete" homepage construction type. The poster position identifies the poster art position and may include a variable to identify the template number and a number to identify the template and a number to identify the poster position.

A poster art position tab text may identify a tab text associated with the poster art position. One number associated with this metadata may include the template number and another number may identify the poster position. The value may be a string that is displayed at a certain position somewhere around or underneath the poster.

A promotional (promo) area title may also be included in the metadata. The promotion area title may specify the title to be shown in the promo area of the homepage. The promotional area may be an area defined within the template. This may also be set forth only in a complete.

The promotional area body may provide certain amount of characters or lines below the title in the promotional area of the homepage. There may be one or several promotional areas within a homepage.

A home page display start and a display end metadata field may also be provided. This may provide a start time and end time for displaying the fields. The start time and end time may correspond to the local time of the particular user device. That is, based upon the display start time and display end time and the local clock, the display may be changed accordingly.

Another area of the content processing system 102 is an input server 212 that receives the various content and converts the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223. Details of the workflow system 220 are set forth below.

The VTPS 223 may encode the packets containing the content. The encoder may encode the data into various transport formats such as DIRECTV® proprietary formats, or industry standard formats. The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier (ID) in the metadata as well as the provider ID. Content, posters and other received information may be assigned related material identifications to make them easier to associate and retrieve. For example, different suffixes may be used to identify related content with the remainder of the material identification being the same.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

The Content Management System (CMS) 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the CMS and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Remote record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate remote record requests to the conditional access transaction system 238. Remote record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Content files may also be provided from the content management system 221 to the content distribution system 260.

The program guide data generated by the program guide system 248 may include information that is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Titles, descriptions and categories may also be provided from the content management system 221 to the content distribution system 260. Content files and metadata may be controlled by the content distribution system 260.

Referring back to the video transport processing system 223, the video transport processing system 223 includes a transport packaging system 270. The transport processing system 270 creates pre-packetized unencrypted files. An encryption module 272 receives the output of the transport processing system and encrypts the packets. Fully packaged and encrypted files may also be stored in the content repository 274. Encryption may take place in the data portion of a packet and not the header portion.

One or more content delivery networks 280a-n may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the IRD 110 and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or asset files, menus structures etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

Figure 3:
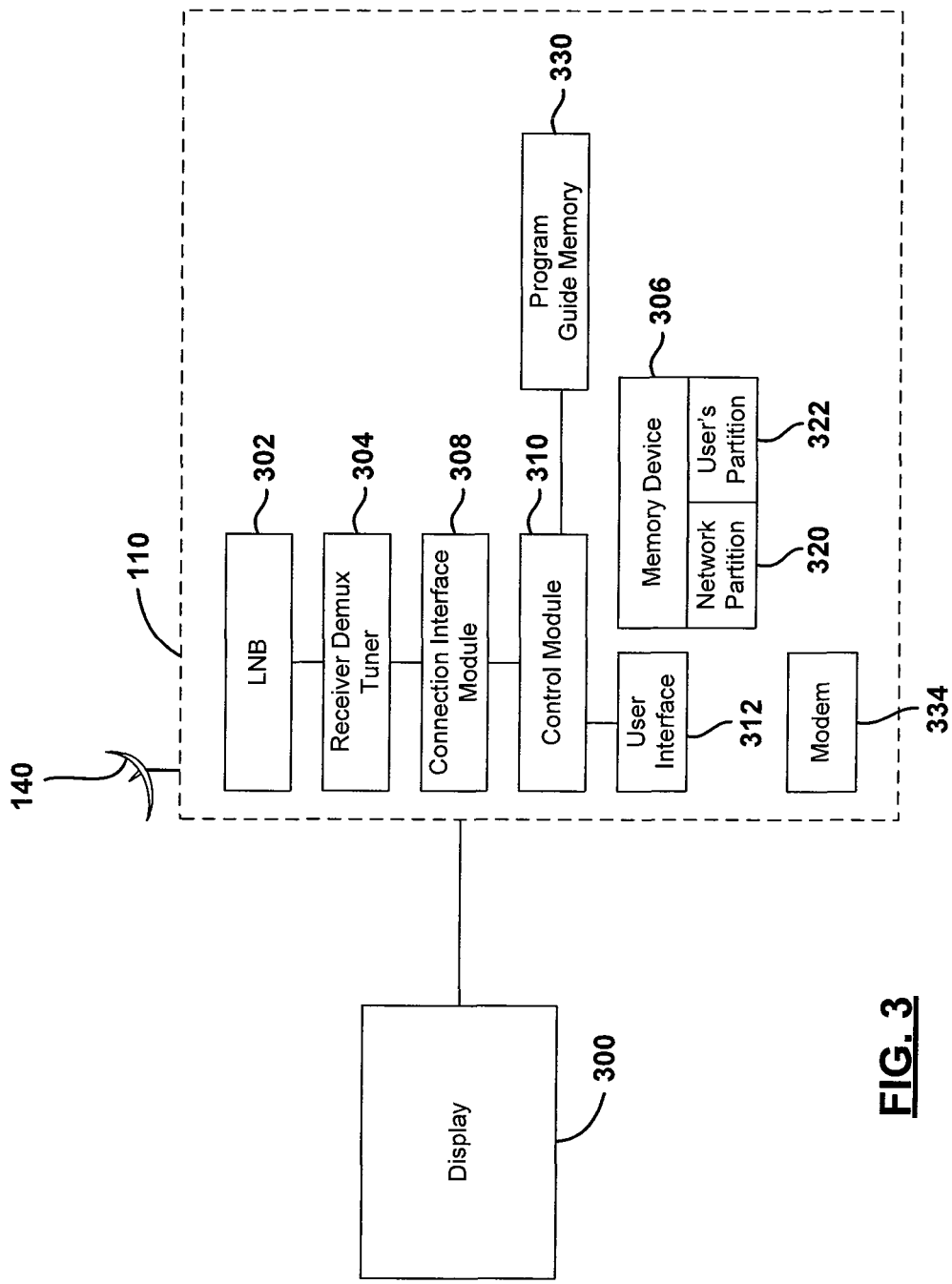
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a memory device 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of or combination of storage devices such as a hard disk drive, DVR, flash memory or other types of memory devices. The memory device 306 may be used to store the content, information, metadata, program guide objects and information and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface. The connection interface module 308 may be used for callbacks.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc. The format for communicating through the connection interface module 308 may be Internet Protocol (IP).

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

A program guide memory 330 may also be included in the device. The program guide memory 330 may be used to store program guide information and homepage information for the linear and virtual channels. The program guide memory 330 may be implemented as a non-volatile memory such as flash memory. The program guide memory 330 may thus be a separate memory device. Memory device 330 may also be integral with recording device 306.

The user device 110 may also include a modem 334 for communicating callback information to a head end or content processing system through a telephone connection. As will be described below, the modem may be used if callbacks cannot be made after attempting a callback using the connection interface module.

Figure 4:
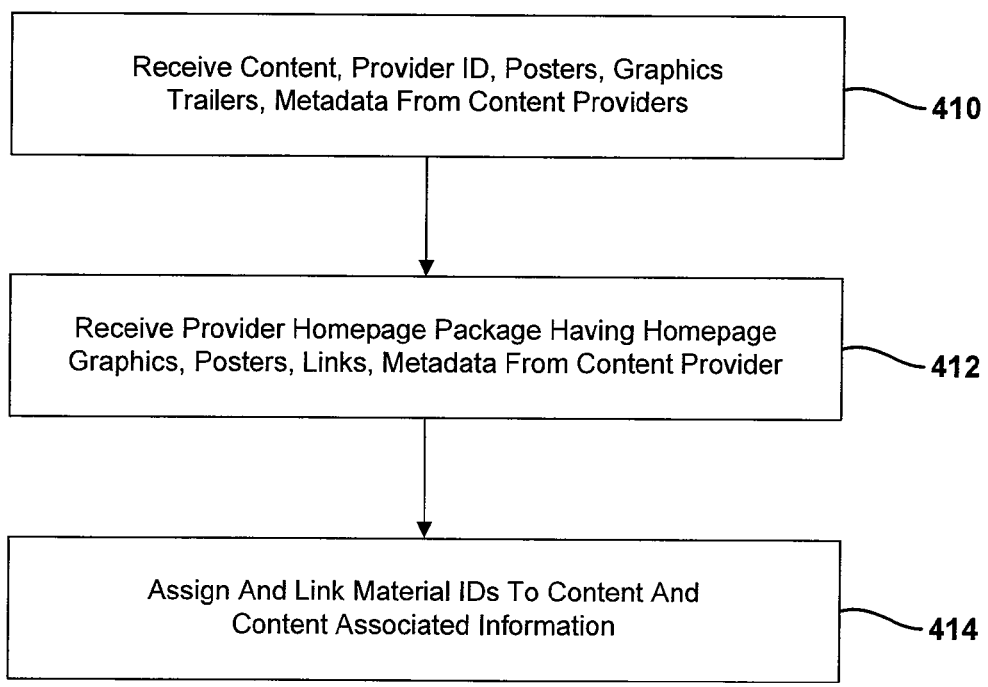
FIG. 4 is a flowchart illustrating a method for linking content and content-associated information.

Referring now to FIG. 4, a method of assigning material identifications to various content and content-associated information is set forth. In step 410, content is received from various content providers. The providers may provide a provider or asset identification (ID) for the content provided. Posters, trailers, graphics, metadata may also be received from content providers. The content and the other content-associated information may be received in different ways or the same way. When received in different ways, they may be associated together in the content processing system. In step 412, the content providers may also provide a homepage package having the homepage graphics, posters, links and metadata from the content provider. The types of metadata that may be received from the content providers were described above in FIG. 1.

In step 414, the material identification is assigned to the content and to the content-associated information. This step may be performed in the content management system of FIG. 2. Preferably the material ID and the associated content information are linked together. As mentioned above, one way to link the content with the content-associated information is to provide a common material identification with various suffixes to identify the various information.

Figure 5:
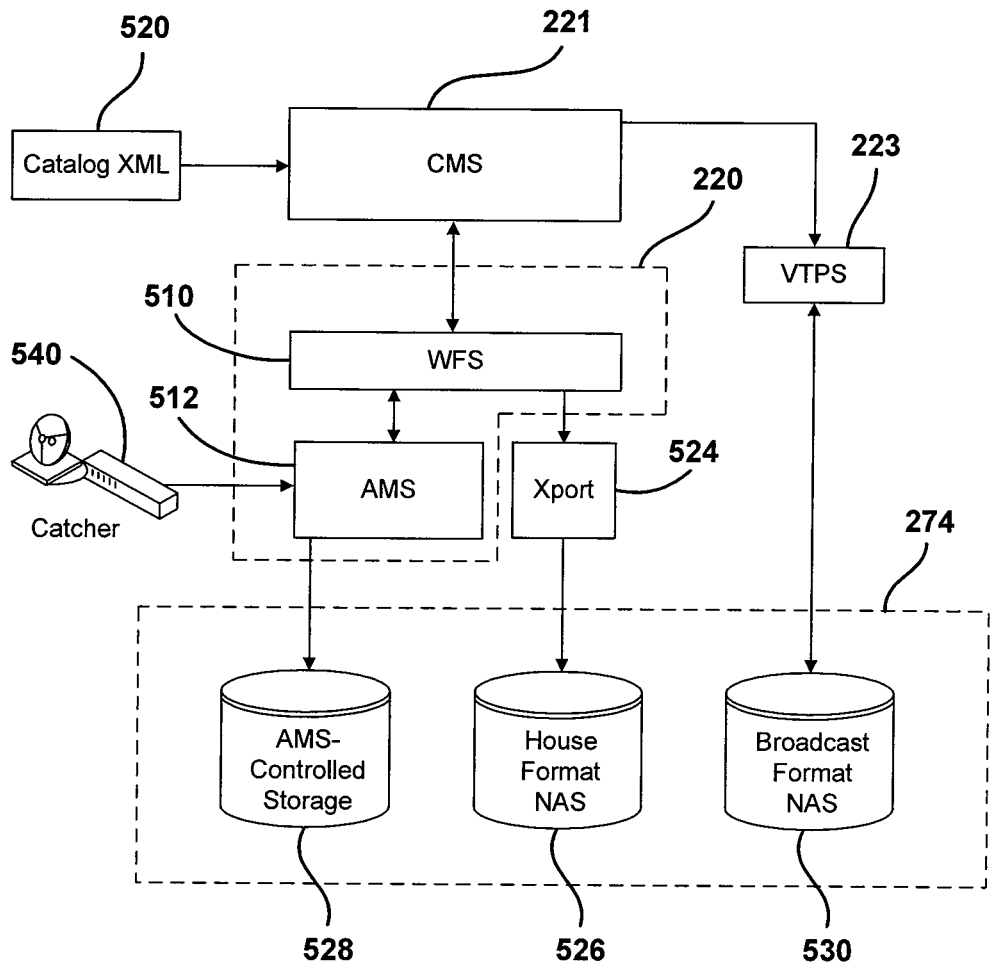
FIG. 5 is a detailed block diagrammatic view of a workflow system of FIG. 2.

Referring now to FIG. 5, a detailed block diagrammatic view of the workflow/asset management system 220 together with its associated other components is illustrated. The workflow system/asset management system 200 may actually include a workflow system 510 and an asset management system 512. Several workflow systems may be present in a system. A primary and standby system may be used. A separate adult content workflow system may also be used. The workflow system 510 communicates with the content management and scheduling system 221. The content management system 221 communicates with the video transport processing system 223 as described above. The content management system may receive XML files such as catalog XML files 520. The XML files may include various metadata as will be further described below. The workflow system 510 may be coupled to an export module 524 for exporting files to a network area storage. Network area storage may be for house format files in box 526. The asset management system 512 may also be coupled to a memory storage device 528 for controlled storage of the received assets. The video transport processing system 223 may store files in a broadcast format network area storage (NAS) system 530. All of the files and memory devices 526, 528 and 530 may be contained in the content repository 274. Content may be received in a catcher 540. The catcher 540 may be associated with a pitcher system (not shown) associated with a content provider. The catcher 540 may include a docking station, a satellite feed, tape, DVD player or network connection. The catcher 540 receives content while the catalog XML block 520 may receive metadata for the various content. Also, the conditional access information may also be provided by the catalog XML 520.

Figure 6:
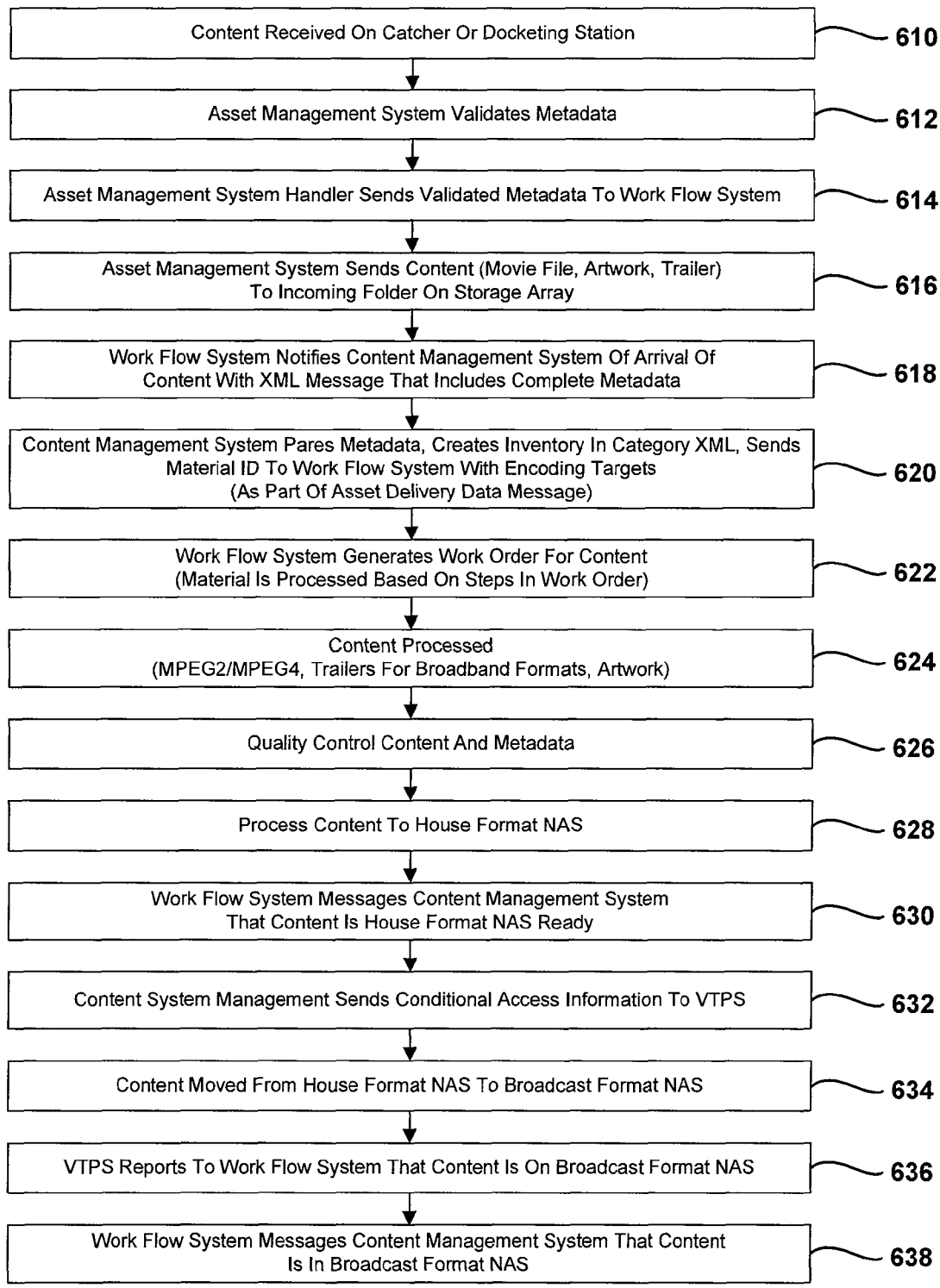
FIG. 6 is a flowchart of a method for operating the workflow system of FIG. 5.

Referring now to FIGS. 5 and 6, the operation of the system illustrated in FIG. 5 is set forth in further detail. Content is received through the catcher 540 or other type of docking station in step 610. The received content may be compressed in various formats such as in a .tar format.

The received files are communicated to the asset management system 512 which validates the metadata associated with the content. In step 614, the asset management system 512 sends validated metadata to the workflow system 510. In step 616, the asset management system 512 sends the content such as a movie file, artwork or trailer to the incoming folder such as within the AMS controlled storage 528.

In step 618, the workflow system 510 notifies the content management system 221 of the arrival of a content file with a notification message such as an XML message or the like that includes the complete metadata. In step 620, the content management system 221 pares the metadata, creates an inventory in the category XML and sends a material ID to the workflow system 510 with encoding targets. The encoding targets set forth the types of devices that the files should be encoded for.

In step 622, the workflow system generates a work order for the content. The work order provides instructions for the formats in which to convert the content. In step 624, the content is processed according to the work order. The content may be converted from a house format to MPEG2, MPEG4 and various trailers may be formatted for broadband distribution. The artwork, if required, may also be formatted using different methods. In step 626, a quality control is performed on the content and metadata.

In step 628, the process content is converted to a house format and stored within the network area storage.

The workflow system 510 messages the content management system that the house content is in the house format and is ready in step 630. In step 632, the content management system 221 sends conditional access information to the VTPS 223. Content is moved from the house format network area storage to the broadcast format memory 530 in step 634. The VTPS 223 combines the content file with the conditional access information received in step 632. The formatting content file and the conditional access information are stored in the broadcast format network area storage block 530. In step 636, the VTPS 223 reports to the workflow system 510 that the content is stored within the broadcast format network area storage 530. In step 638, the workflow system 510 messages the content management system 221 that the content is in the broadcast format in the network area storage.

The processing may take place in different formats for different types of materials. For example, the website trailers may be in Windows Media® format and/or QuickTime® format. The content file itself may be in other formats such as MPEG2, MPEG4 or various other types of formats suitable for mobile and fixed devices.

Figure 7:
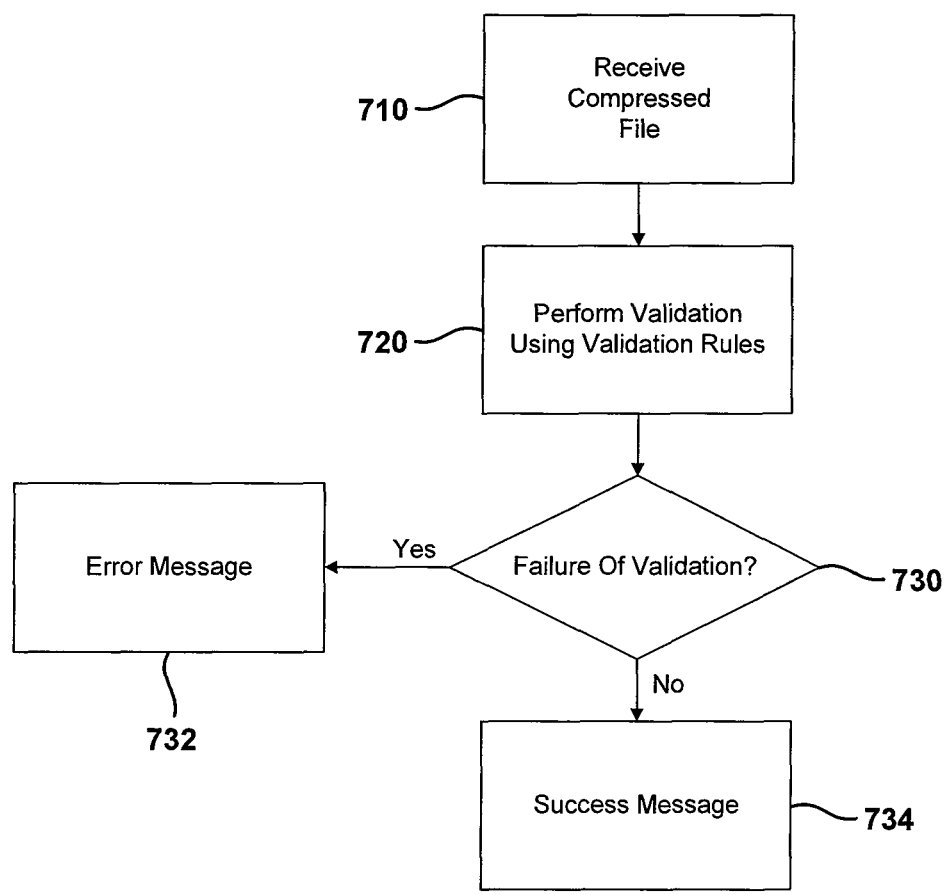
FIG. 7 is a flowchart of a method for receiving files.

Referring now to FIG. 7, validation was briefly mentioned in step 612. The system receives a compressed file in step 710. In step 720, validation may be performed on the files. Validation in step 720 may be performed if certain conditions are found. These conditions will be described below in FIG. 8.

Once the file is validated in step 720, step 730 determines whether the validation has been performed successfully. In step 730, if the validation has failed, step 732 generates an error message or a failure message indicating that validation has not been properly performed. In step 730, if no validation failure is found, step 734 generates a success message indicative of a successful validation of the file.

Figure 8:
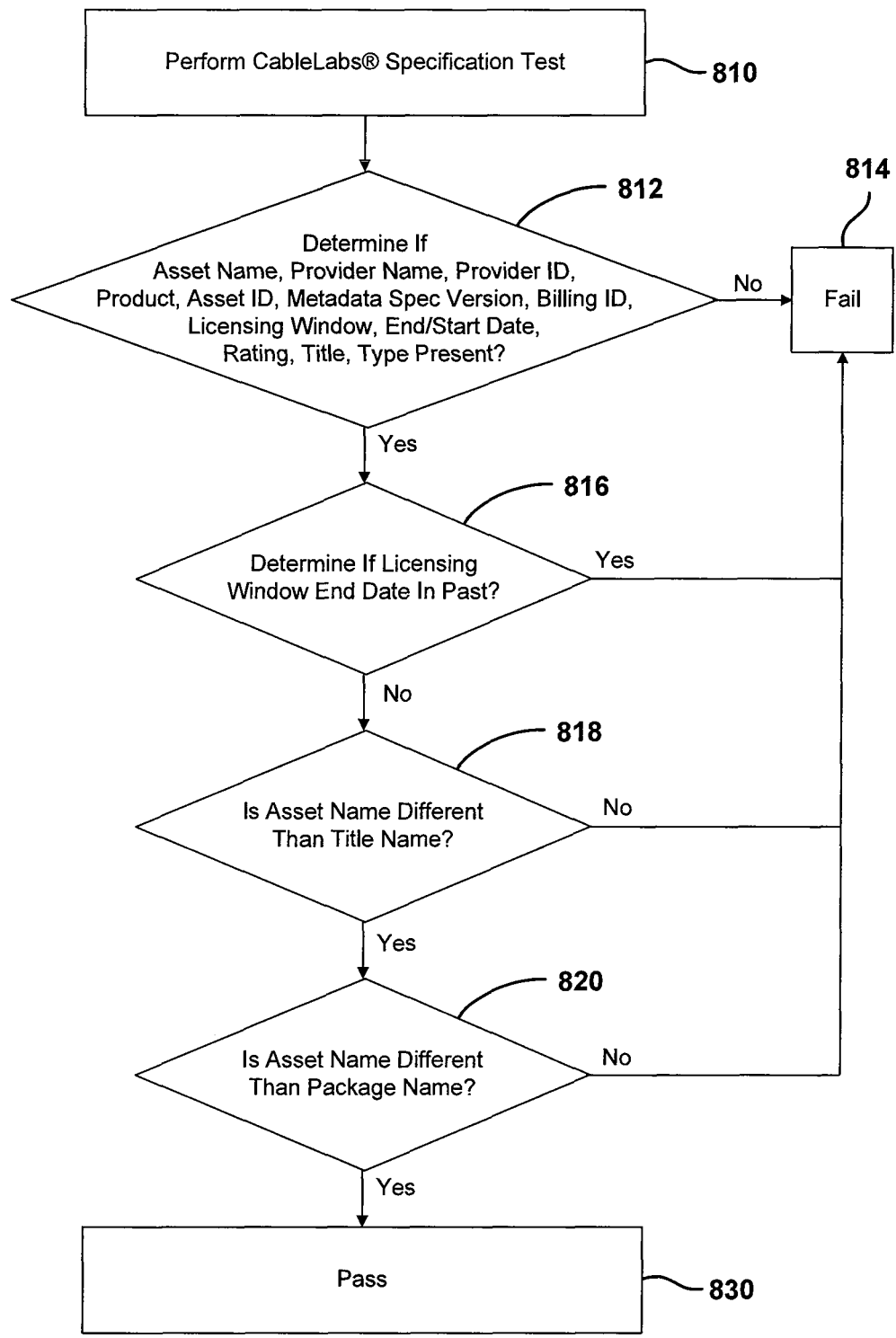
FIG. 8 is a flowchart of a method for validating metadata associated with a content file.

Referring now to FIG. 8, the validation aspect of FIG. 7 is provided in further detail. In step 810, a CableLabs® specification test may be performed to determine if the CableLabs® format has been met. In this test, step 812 may analyze the metadata associated with a content file for features such as the asset name, the provider name, the provider ID, the product, the asset ID, the metadata specification version, the billing ID, the licensing window, the end/start date, the rating, the title, and the type. If one of these types of metadata is not found, a failure message may be generated in step 814. If each of these types of metadata is present, step 816 may be performed. In step 816, if the licensing window end date is in the past, then the system fails in step 814. This ensures current content is being made unavailable. In step 816, if the licensing window is not in the past, meaning that the licensing window has not expired, step 818 determines if the asset name is different than the title name. If the asset name is not different than the title name, the system generates a failure message in step 814. If the asset name is different than the title name, step 820 is performed. In step 820, if the asset name is not different than the package name, then a failure message is generated in step 814. In step 820, if the asset name is different than the package name, step 830 generates a pass signal indicative that the file has been successfully validated.

In the validation of FIG. 8, the validation applies to CableLabs®-specific content. CableLabs® specification sets forth various types of metadata that may be included in a file and sets forth a specific format for that type of material. In addition, the content processing provider, such as DIRECTV®, also includes certain types of metadata categories in a metadata category list. These may be referred to as content processing system provider metadata or simply provider metadata.

Figure 9:
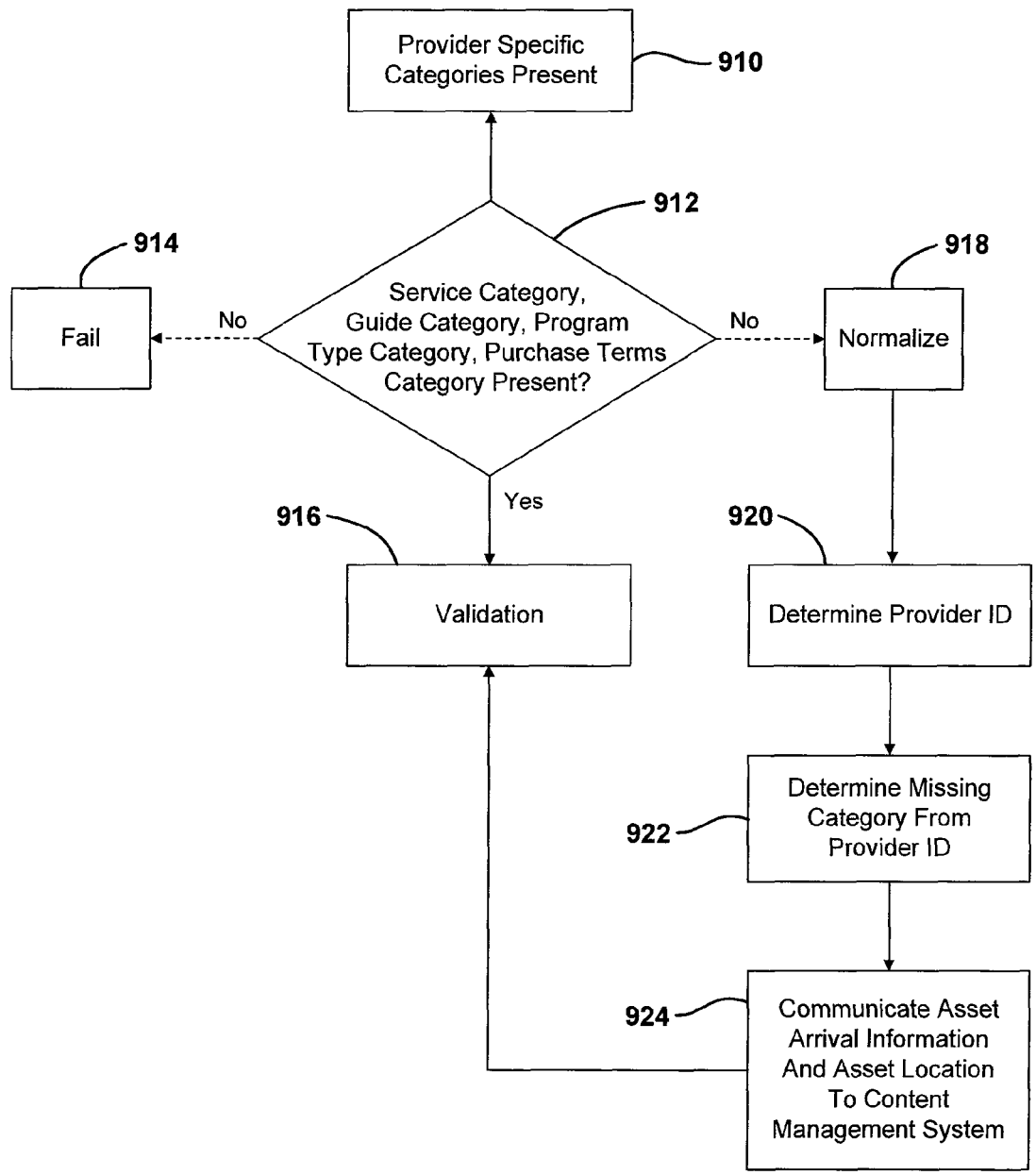
FIG. 9 is a flowchart of a method of normalizing content data.

Referring now to FIG. 9, the content processing system provider may provide specific metadata categories in step 910. The categories may include a service category, a guide category, a program type category, and purchase terms category. In certain circumstances, if any of the four categories are not present, step 914 generates a failure signal. If each of these categories is present, step 916 may perform validation and generate a validation signal as in FIG. 8.

However, it may be desirable to normalize the data should one of the system categories not be present from the content processing system provider-specific categories. In step 918, the normalization process begins. In step 920, the normalization process may determine the provider ID from the metadata in the CableLabs® format. The provider ID in this example is "STARZENCORE.com". From the provider ID, the missing category information may be determined in step 922. For example, if the guide category does not exist, the category associated with the STARZ network is "movies" for the guide category. If the service category does not exist, the provider ID may put the service category of "STARZ_SHOW_SUB" as a value. If the program type does not exist, then the program ID corresponding with STARZENCORE may correspond to the program type as "MOVIE." Of course other relationships may be established such as Disney® for the kids' category, ESPN® for sports category, and the like.

It should be noted that all or some of the optional categories in block 912 may be provided. The purchase terms category may be easily eliminated from the list. Any one or some of the other categories may also be eliminated depending on the system requirements.

Various types of guide categories, such as movies, kids, entertainment and sports may be provided. The programming types may be movies, sports, or the like. The service categories may be dependent upon the service group or network associations associated with the service group or provider.

The normalization may take place when the package is exported to the workflow system. When the normalization and validation are passed, the asset arrival information and asset location is provided to the content management system. The content management system then assigns a material ID as described above.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   receiving content;
   storing the content in an incoming folder;
   notifying a content management system from a workflow system of receiving the content;
   generating a material identification for the content at the content management system;
   creating an inventory list at the content management system;
   communicating the material identification to the workflow system;
   processing the content into a plurality of differently formatted files;
   storing the plurality of differently formatted files in a broadcast folder different than the incoming folder;
   communicating conditional access data to a video transport processing system from the content management system; and
   communicating a status message to the content management system when the plurality of differently formatted files is stored in the broadcast folder.

2. A method as recited in claim 1 wherein after communicating conditional access data, associating the conditional access data and the content in the video transport processing system.

3. A method as recited in claim 1 wherein receiving the content comprises receiving the content at a catcher.

4. A method as recited in claim 1 wherein receiving the content comprises receiving the content at a docking station.

5. A method as recited in claim 1 wherein receiving content comprises receiving content from a satellite.

6. A method as recited in claim 1 wherein receiving content comprises receiving content from a tape or DVD.

7. A method as recited in claim 1 further comprising receiving metadata and wherein after receiving content, validating the metadata.

8. A method as recited in claim 7 wherein validating the metadata comprises validating the metadata in an asset management system.

9. A method as recited in claim 1 wherein the formatted files are formatted in an MPEG2 or MPEG4 format.

10. A method as recited in claim 1 wherein processing the content comprises processing folders.

11. A method as recited in claim 1 wherein after processing the content, quality checking the content.

12. A system comprising:
    a receiving system receiving content;
    an incoming folder storing the content;
    a workflow system generating a notice signal corresponding to receiving of the content; and
    a content management system receiving the notice signal, said content management system generating a material identification for the content, creating an inventory list at the content management system and communicating the material identification to the workflow system,
    said workflow system processing the content into a plurality of differently formatted files and storing the differently formatted files in a broadcast folder different than the incoming folder,
    said content management system communicating conditional access data to video transport processing system, and
    said workflow system communicating a status message to the content management system when the plurality of formatted files is stored in the broadcast folder.

13. A system as recited in claim 12 wherein the video transport processing system associates the conditional access data and the content after communicating conditional access data.

14. A system as recited in claim 12 further comprising a catcher receiving the content.

15. A system as recited in claim 12 further comprising a docking station receiving the content.

16. A system as recited in claim 12 further comprising a satellite receiving the content.

17. A system as recited in claim 12 further comprising a tape or DVD receiving the content.

18. A system as recited in claim 12 wherein the receiving system validates metadata after receiving the content.

19. A system as recited in claim 12 further comprising an asset management system validating metadata.

20. A system as recited in claim 12 wherein the formatted files are formatted in an MPEG2 or MPEG4 format.

21. A system as recited in claim 12 wherein the workflow system processes content folders.

22. A system as recited in claim 12 wherein the workflow system quality checks the content after processing.

* * * * *